(12) United States Patent
Yamamoto (10) Patent No.: US 8,075,444 B2
(45) Date of Patent: Dec. 13, 2011

(54) FRICTION DRIVE DEVICE

(75) Inventor: Takeshi Yamamoto, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 1048 days.

(21) Appl. No.: 11/915,957

(22) PCT Filed: Jul. 18, 2006

(86) PCT No.: PCT/IB2006/001972
§ 371 (c)(1),
(2), (4) Date: Nov. 29, 2007

(87) PCT Pub. No.: WO2007/010364
PCT Pub. Date: Jan. 25, 2007

(65) Prior Publication Data
US 2008/0207378 A1 Aug. 28, 2008

(30) Foreign Application Priority Data

Jul. 20, 2005 (JP) ................................. 2005-209701

(51) Int. Cl.
*F16H 13/10* (2006.01)
(52) U.S. Cl. .......................................... 476/61; 476/70
(58) Field of Classification Search .................... 476/61, 476/70; 475/165, 183
See application file for complete search history.

(56) References Cited

U.S. PATENT DOCUMENTS

2003/0199357 A1* 10/2003 Ai .................................. 475/165
2005/0143211 A1* 6/2005 Yamamoto ..................... 475/183

FOREIGN PATENT DOCUMENTS

| JP | 04-370447 A | 12/1992 |
| JP | 08-277896 A | 10/1996 |
| JP | 2002-349654 A | 12/2002 |
| WO | WO 03/091602 | 11/2003 |

OTHER PUBLICATIONS

The extended European Search Report of corresponding European Application No. 06795126.9, dated Mar. 2, 2011.

* cited by examiner

*Primary Examiner* — William C Joyce
(74) *Attorney, Agent, or Firm* — Global IP Counselors, LLP (57) ABSTRACT

A friction drive device has first and second rollers, in which the ratio of the transmission power and the pressing power is nearly constant regardless of the magnitude of the transmission power. The rollers have center axes that are spaced apart by prescribed radial distance, and arranged relative to an x y coordinate system when the rollers are not under load such that the x y coordinate system has an origin corresponding to the center axis of the first roller, and the y-axis passes through the center axis of the second roller. The cam surface is located in a first quadrant of the x y coordinate system, and has a concave arc with a single radius, such that the concave arc has a cam surface center located in a third quadrant of the x y coordinate system near or on an imaginary arc defined by the prescribed radial distance.

3 Claims, 7 Drawing Sheets

FRICTION DRIVE DEVICE

CROSS-REFERENCE TO RELATED APPLICATIONS

This U.S. National stage application claims priority to Japanese Patent Application No. 2005-209701, filed in Japan on Jul. 20, 2005. The entire disclosure of Japanese Patent Application No. 2005-209701 is hereby incorporated herein by reference.

BACKGROUND OF THE INVENTION

1. Field of the Invention

The present invention relates to a friction drive device that is equipped a pair of rollers being pressed to contact with each other via a cam member so as to transfer mechanical power between them at a reduction ratio or an overdrive speed ratio.

2. Background Information

Some conventional art friction drive devices are provided with a wedge roller disposed between a drive roller and a driven roller, so as to automatically generate a pressing force proportional to a transmission force by maintaining the wedge roller at an angle in the direction of a tangent line at the contact point of the rollers (see, e.g., Japanese Laid-Open Patent Publication No. 2002-349654).

In view of the above, it will be apparent to those skilled in the art from this disclosure that there exists a need for an improved friction drive device. This invention addresses this need in the art as well as other needs, which will become apparent to those skilled in the art from this disclosure.

SUMMARY OF THE INVENTION

When the pressing force increases in conjunction with an increase in a transmission force, the contact parts of the rollers are elastically deformed and the angle relative to the wedge roller is reduced. In other words, a problem arise in that an excessive pressing force is applied to the roller when the transmission force increases, such that the service life of the rollers and support bearings are reduced, and power transmission efficiency is adversely affected.

In view of these problems, one object of the present invention is to provide a friction drive device capable of improving service life and power transmission efficiency by preventing the generation of excessive pressing force even when the transmission force is large via a simple construction that only uses a bearing roller and an actuator.

In accordance with one aspect of the present invention, a friction drive device is provided that basically comprises a first roller, a second roller and a cam member. The first roller includes a roller support part. The second roller is rotatably engaged with the first roller to receive a press force from the first roller at a contact point between the first and second rollers to transmit mechanical power between the first and second rollers. The cam member supports the first roller through the roller support part. The cam member includes a cam surface having an angle relative to a tangent line at the contact point of the first and second rollers such that the cam surface presses against the roller support part to transmit a drive force between the first and second rollers via friction generated at the contact point. The first and second rollers having first and second center axes, respectively that are spaced apart by prescribed radial distance. The first and second rollers are further configured and arranged relative to an x y coordinate system when the first and second rollers are not under load such that the x y coordinate system has an x-axis and a y-axis with an origin corresponding to the first center axis of the first roller, and the y-axis passes through the second center axis of the second roller. The cam surface is located in a first quadrant of the x y coordinate system. The cam surface has a concaved cross sectional shape lying in a plane perpendicular to the first center axis that forms a concave arc with a single radius, such that the concave arc of the cam surface has a center located in a third quadrant of the x y coordinate system near or on an imaginary arc defined by the prescribed radial distance extending from the first center axis of the first roller.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
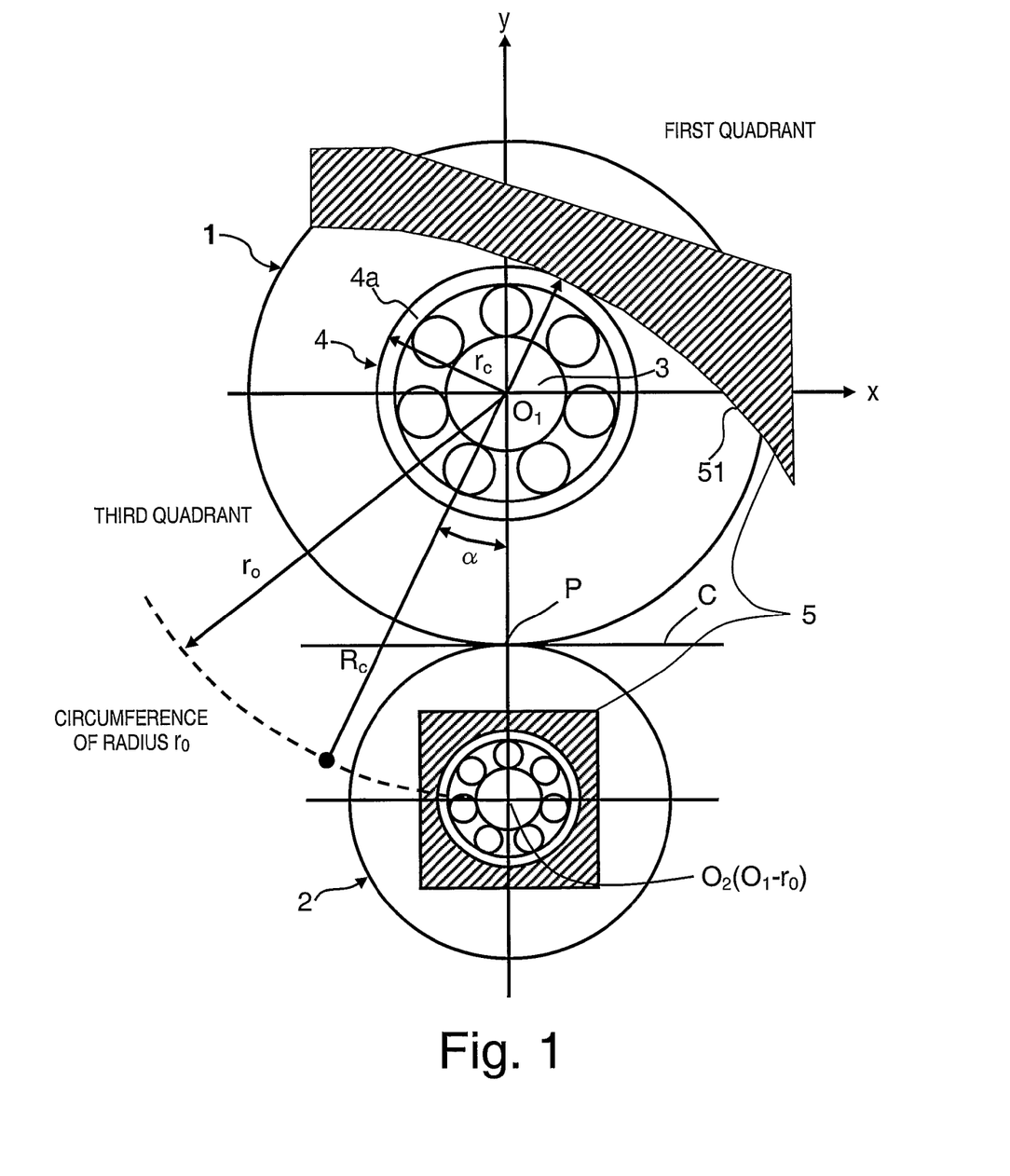
FIG. 1 is a schematic diagram of a friction drive device according to a first embodiment of the present invention.

Referring initially to FIG. 1, a schematic diagram of a friction drive device in accordance with a first embodiment of the present invention. The friction drive device basically includes a drive roller 1 and a driven roller 2, which are pressed against (pressing contact) each other a roller contact point P between the rollers 1 and 2. Thus, mechanical power can be transmitted between the rollers 1 and 2 by friction force generated at the roller contact point P between the rollers 1 and 2. The drive roller 1 corresponds to a first roller of the present invention, while the driven roller 2 corresponds to a second roller of the present invention.

Basically, the drive roller 1 is integrally formed at its center with a roller shaft 3 that acts as an inner race of a first roller bearing 4. The first roller bearing 4 has an outer race 4a that is supported by a frame member 5 at an upper portion of the frame member 5 so that the drive roller 1 can rotate relative to the frame member 5. Hence, the first roller bearing 4 is made up of the roller shaft 3, the outer race 4a (cam follower), and a plurality of balls arranged between them. Similarly, the driven roller 2 is integrally formed at its center with a roller shaft that acts as an inner race of a second roller bearing. The second roller bearing has an outer race that is supported by the frame member 5 at a lower portion of the frame member 5 so that the driven roller 2 can rotate relative to the frame member 5. Hence, the second roller bearing is made up of the roller shaft, the outer race, and a plurality of balls arranged between them.

The roller shaft of the driven roller 2 is supported by the frame member 5 in a position-regulated state, i.e. such that the center axis $O_2$ of the driven roller 2 remains stationary with respect to the frame member 5. The roller shaft 3 of the drive roller 1 is rotatably supported on the frame member 5 by the first roller bearing 4 to pivot about the center axis $O_2$ of the driven roller 2 such that the drive roller 1 moves with respect to the frame member 5. The frame member 5 corresponds to a rotation supporting part having a cam member with a cam surface 51 that is configured and arranged in accordance with the present invention as explained below. The roller bearing 3 corresponds to a roller support part of the drive roller 1 in accordance with the present invention as explained below.

The cam surface 51 includes a concave curve with a cam slope that is formed so that the slope angle changes smoothly relative to a tangent line C at the roller contact point P of the drive roller 1 and the driven roller 2, where the slope angle is an angle between a tangent line at a point on the cam surface 51 contacting the drive roller 1 and the tangent line at the roller contact point P of the drive roller 1 and the driven roller 2. As a result, the direction in which the cam surface 51 applies a force to the drive roller 1 will change and the way the drive roller 1 presses against the driven roller 2 will change.

When the drive roller 1 has a center axis $O_1$ of rotation, while the driven roller 2 having a center axis $O_2$ of rotation that is spaced from the center axis $O_1$ of the drive roller 1 by a prescribed radial distance $r_0$, as seen in FIG. 1. When the rollers 1 and 2 are not under load (i.e., the no torque position shown in FIG. 1), the rollers 1 and 2 are configured and arranged relative to an x y coordinate system having an x-axis and a y-axis with an origin of the x y coordinate system corresponding to the center $O_1$ of the drive roller 1, the y-axis passes through the center axis $O_2$ of the driven roller 2. The cam surface 51 is located in a first quadrant of the x y coordinate system. The cam surface 51 has a concave cross sectional shape or profile lying in a plane perpendicular to the center axis $O_1$ of the drive roller 1. This concave cross sectional shape or profile of the cam surface 51 forms a single concave cam surface arc with a single radius having a center point of the concave cam surface arc of the cam surface 51 located in the third quadrant of the x y coordinate system near or on an imaginary arc defined by the prescribed radial distance $r_0$ extending from the center axis $O_1$ of the drive roller 1.

As a result service life and power transmission efficiency are improved by preventing the generation of excessive pressing force even when the drive force is large via a simple construction that only uses a roller and an actuator. Furthermore, processing of the cam surface 51 and shape inspections of finished parts are easy and excellent utility is provided since the cam profile can be simply calculated from the x and y functions alone.

Figure 2:
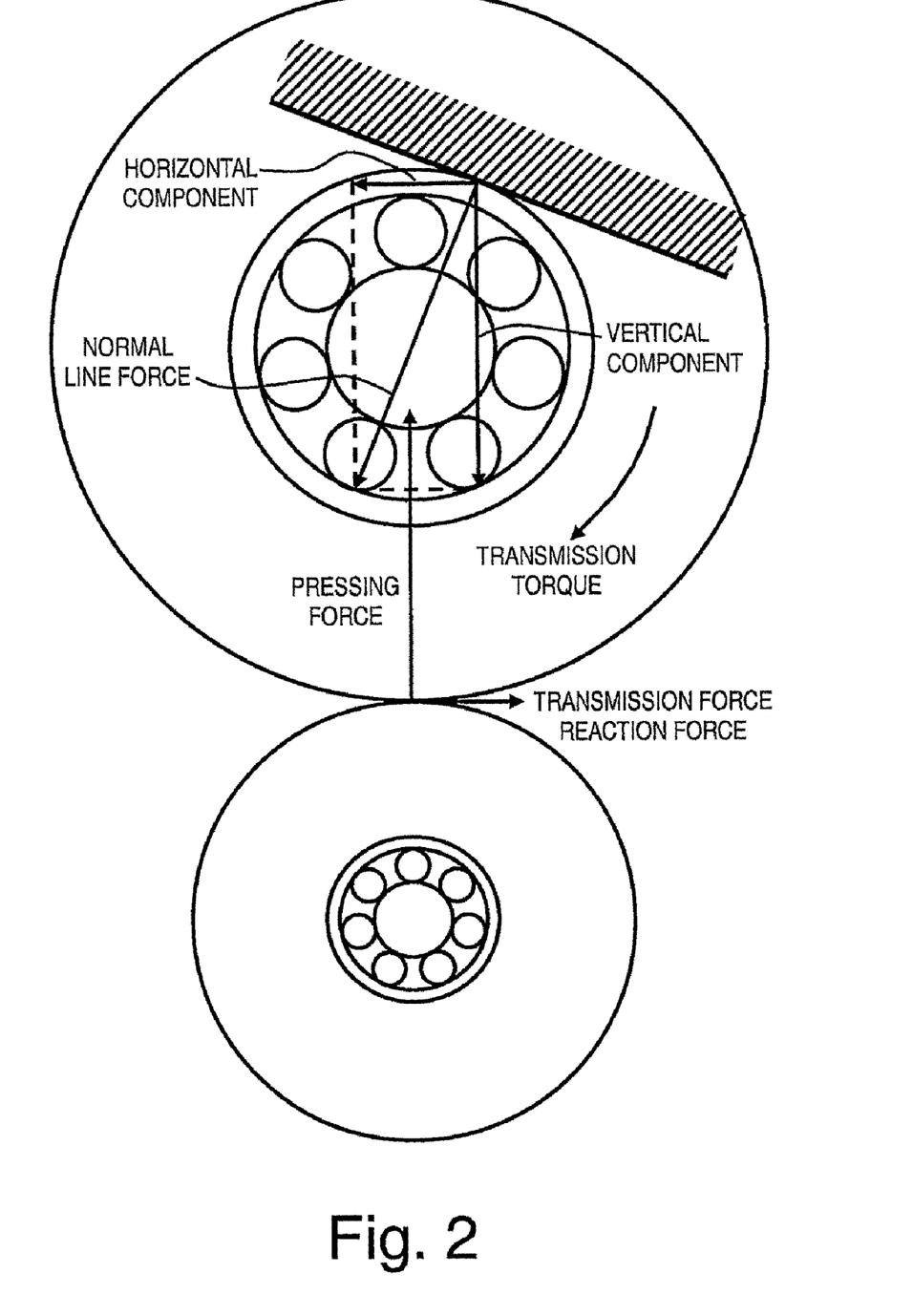
FIG. 2 is a schematic diagram of a relative friction drive device with a linear cam surface that shows the relationships of forces and torque acting on a drive roller of the friction drive device.
Figure 3:
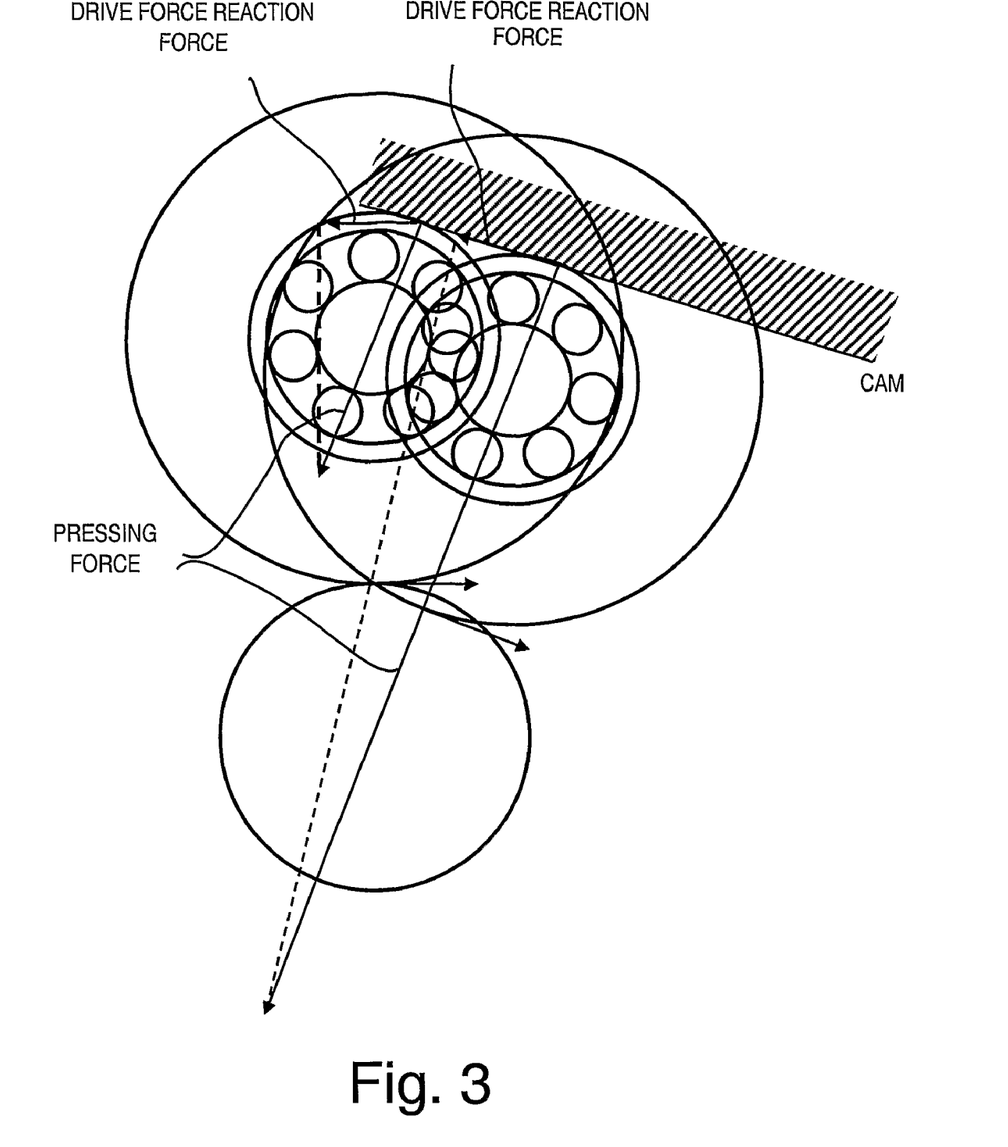
FIG. 3 is a schematic diagram of the relative friction drive device with the linear cam surface illustrated in FIG. 2, showing the change in the contact point of the rollers at high torque and low torque.
Figure 4:
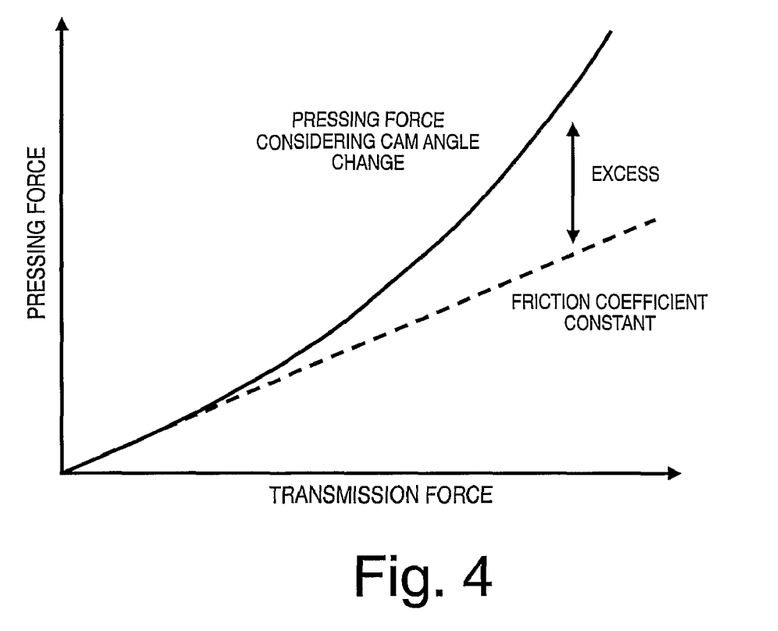
FIG. 4 is a graph illustrating the characteristics of the relationship of the generated pressing force relative to the transmission force in the relative friction drive device illustrated in FIGS. 2 and 3.

The basic operation of friction drive devices will now be briefly described with reference to FIG. 2, which illustrates a friction drive device that basically corresponds to selected friction drive devices disclosed in U.S. Patent Publication No. 2005/0143211 (See, FIGS. 1-16 and Japanese Patent Application No. 2003-433910). In this relative friction drive device, a pressing force that is proportional to the transmission torque is applied between the rollers by supporting one roller at a cam surface having an angle relative to a tangent line at the contact point of the rollers. In general, since the ratio of the pressing force and the transmission force (i.e., the friction or traction coefficient) is nearly constant, an optimum pressing force that is neither excessive nor insufficient is applied insofar as the transmission force and the pressing force are proportional. In this friction drive device, the roller contact point is elastically deformed when the pressing force increases in conjunction with an increase in the transmission force. In order to absorb this, when the roller contact point moves on the cam surface, the roller contact point moves as shown in FIG. 3 to change the direction of the transmission force. Since the angle of the cam surface is fixed, when both angle α decreases and the ratio of the pressing force relative to the transmission force increases (FIG. 4). Thus, an excessive pressing force may be applied to the roller.

Another friction drive device is disclosed in U.S. Patent Publication No. 2005/0143211 (See, FIGS. 17-21 and Japanese Patent Application No. 2004-57639). In particular, the ratio of the pressing force and the transmission force can be set to be normally constant by specifying the configuration of the cam profile (cam cross sectional surface shape) expressed by Equations (1) and (2) below. In the Equations (1) and (2), the coordinates $(x_c, y_c)$ are the coordinates of the cam surface, the angle α is the angle of the cam surface pressing force and the roller pressing force at the initial position at which the transmission force is not working, and the angle θ is the angle of movement of the roller relative to the center axis $O_2$.

$$x_c = r_0 \exp\left\{-\frac{\theta\sec(\alpha+\theta)\sin\alpha}{\cos\theta + \sin\theta\tan(\alpha+\theta)}\right\}\sin\theta + r_c\sin(\alpha+\theta) \quad (1)$$

$$x_c = r_0\left[\exp\left\{-\frac{\theta\sec(\alpha+\theta)\sin\alpha}{\cos\theta + \sin\theta\tan(\alpha+\theta)}\right\}\cos\theta - 1\right] + r_c\cos(\alpha+\theta) \quad (2)$$

Figure 5:
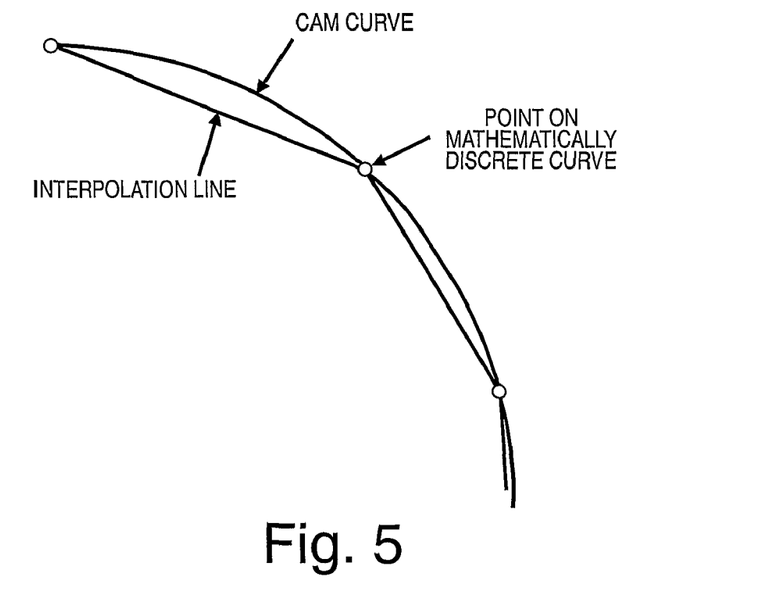
FIG. 5 is a diagram of a mathematically curve shows the difficulty of examination and processing of the relative friction drive device illustrated in FIGS. 2 and 3.

Because of the complication of the Equations (1) and (2), the values of the angle θ and the coordinates x and y may become discretized values that require interpolation, such that the curvature departed from that shown in FIG. 5.

In contrast, as mentioned above, the cam surface 51 of the friction drive device of the first embodiment of the present invention is located in the first quadrant of the designated coordinate system (x, y), with the cam surface 51 having a concave cross sectional surface shape or profile forming the single concave cam surface arc with a single radius and a center point of the concave cam surface arc of the cam surface 51 located in the third quadrant in the x y coordinate system near or on the arc prescribed by the radial distance $r_0$ from the center axis $O_1$ of the drive roller 1.

In FIG. 1, when the center coordinate of the drive roller 1 is designated (x, y), the center distance r of the driven roller 2 can be represented by Equation 3 below.

$$r = \sqrt{x^2 + (y+r_0)^2} \quad (3)$$

When the cam surface 51 has the cam surface arc with the radius $R_c$, the contact angle of the cam follower (the outer race 4a) at the initial position is designated as angle $\alpha$, and the radius of the cam follower (the outer race 4a) is designated as radius $r_c$, then the center coordinates $(x_0, y_0)$ of the cam surface 51 can be represented by Equations (4) and (5) below.

$$x_0 = -(R_c - r_c)\sin\alpha \quad (4)$$

$$y_0 = -(R_c - r_c)\cos\alpha \quad (5)$$

Figure 6:
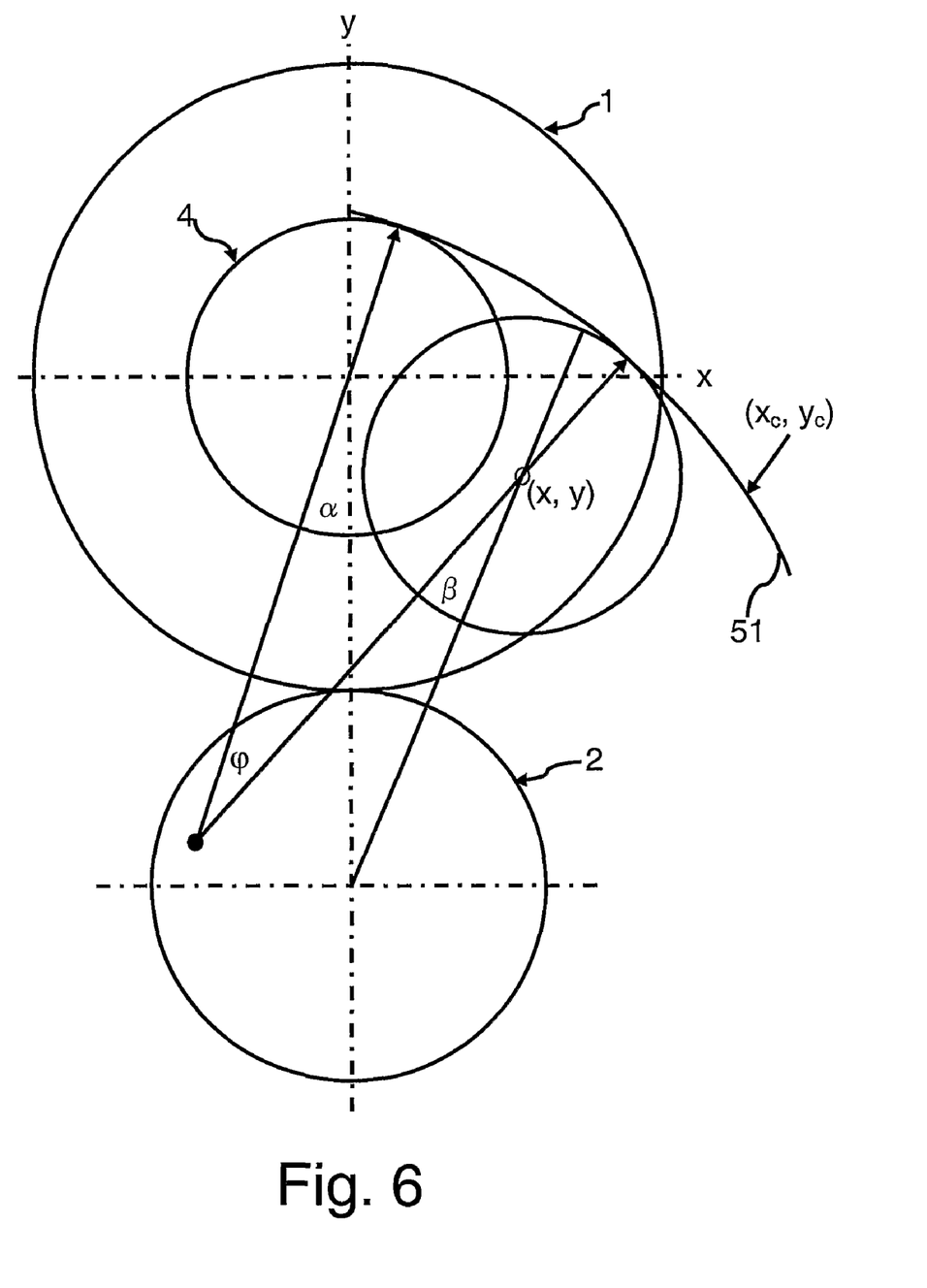
FIG. 6 is a diagram of the movement of the drive roller and the change of the center coordinates of the drive roller in accordance with the first embodiment of the present invention.

As seen in FIG. 6, when the drive roller 1 has moved just an angle $\phi$ relative to the center of the cam surface 51, the center coordinates of the drive roller 1 change as shown in Equations (6) and (7) below.

$$x = (R_c - r_c)\sin(\alpha+\phi) + x_0 = (R_c - r_c)\{\sin(\alpha+\phi) - \sin\alpha\} \quad (6)$$

$$y = (R_c - r_c)\cos(\alpha+\phi) + x_0 = (R_c - r_c)\{\cos(\alpha+\phi) - \cos\alpha\} \quad (7)$$

At this time, the angle $\beta$ formed by a straight line passing through the centers of the rollers 1 and 2 and a straight line passing through the contact point of the drive roller 1 against the cam surface 51 and the center of the arc of the cam surface 51, can be represented by Equation (8) below.

$$\beta = \alpha + \phi - \arcsin x/y \quad (8)$$

When the ratio of the roller pressing force relative to the increase of the transmission force is constant and the angle $\beta$ equals the angle $\alpha$, then the function shown in Equation (9) must be satisfied.

$$\phi - \arcsin x/y = 0 \quad (9)$$

By solving simultaneous Equations (3), (6), (7), (9) the following Equation (10) below can be derived.

$$R_c - r_c = \quad (10)$$

$$r_0 \left\{ \frac{2\cos(\alpha + \varphi/2)\cos(\varphi/2)\cos\varphi}{\cos 2\varphi + \cos(2\alpha + \varphi)} - 4\cos^2\frac{\varphi}{2}\sin(\alpha + \varphi/2)\sin\frac{\varphi}{2} \right\}$$

In this case, although the angle $\alpha$ exists in the function $\mu = \tan\alpha$ with regard to the roller traction or friction coefficient $\mu$, where $\mu$ is normally less than 0.1 and the angle $\alpha$ is several times larger. The deformation occurring at the roller contact point P is quite small and on the order of microns, and the angle $\phi$ is also a small value at several microns. Therefore, the sine is 0 and the cosine is near 1 relative to the angles $\alpha$ and $\phi$ and their (unchanged order) functions. When these values are substituted in Equation (10), Equation (11) below is obtained.

$$R_c - r_c \approx r_0 \quad (11)$$

The term $(R_c - r_c)$ on the left side of Equation (11) is equal to the distance from the center axis $O_1$ to the center of the cam surface. Therefore, the ratio of the transmission force and the roller pressing force is nearly constant since the cam surface 51 has a cam surface arc with the radius $R_c$, the center of the cam surface arc lies on a straight line from the center axis $O_1$, and on the arc defined by the prescribed radius $r_0$ extending from the center axis $O_1$.

Figure 7:
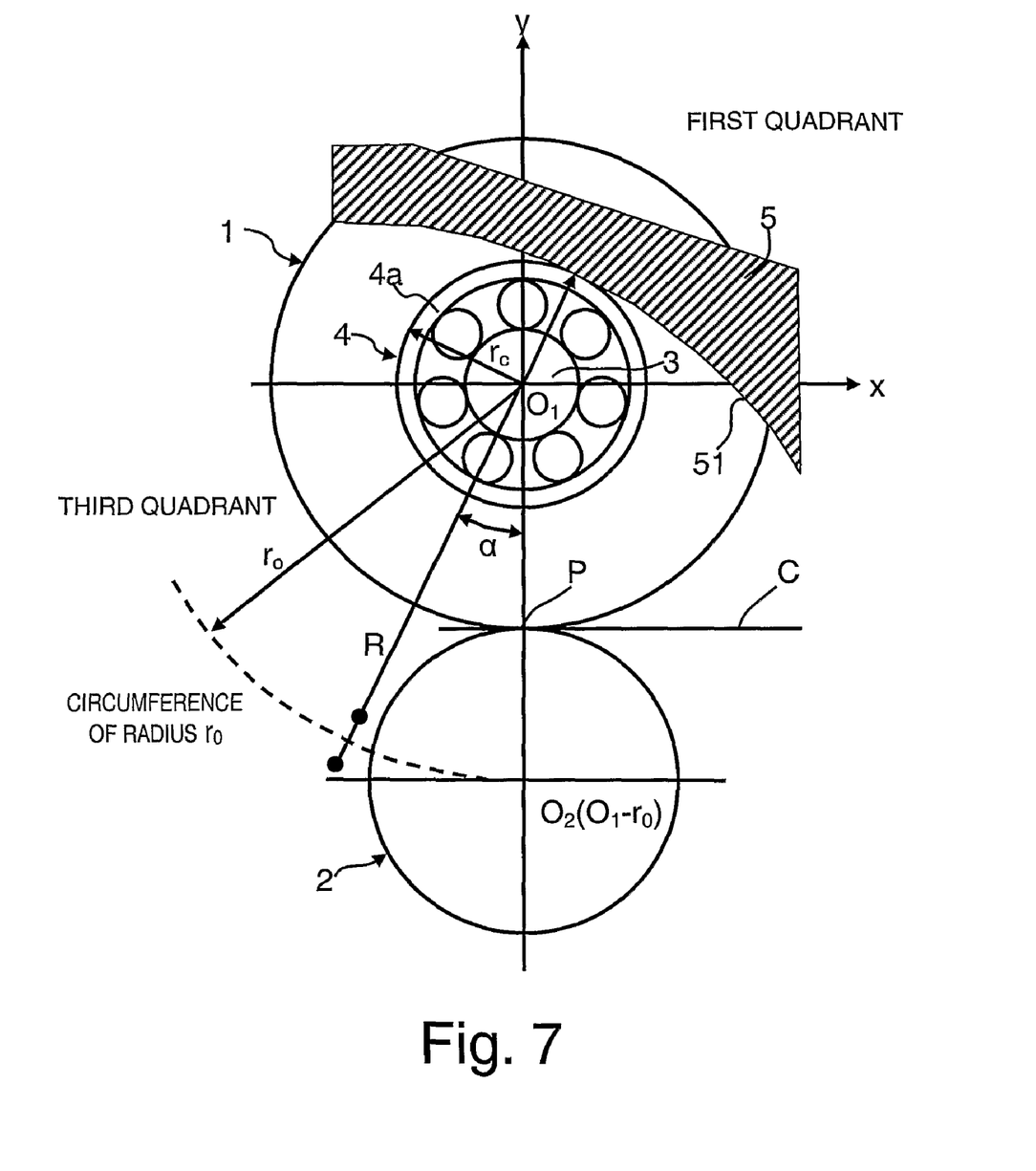
FIG. 7 is a schematic diagram of the friction drive device according to a second embodiment of the present invention in which the center of the cam surface arc is set slightly inside or outside the circumference of radius $r_0$.
Figure 8:
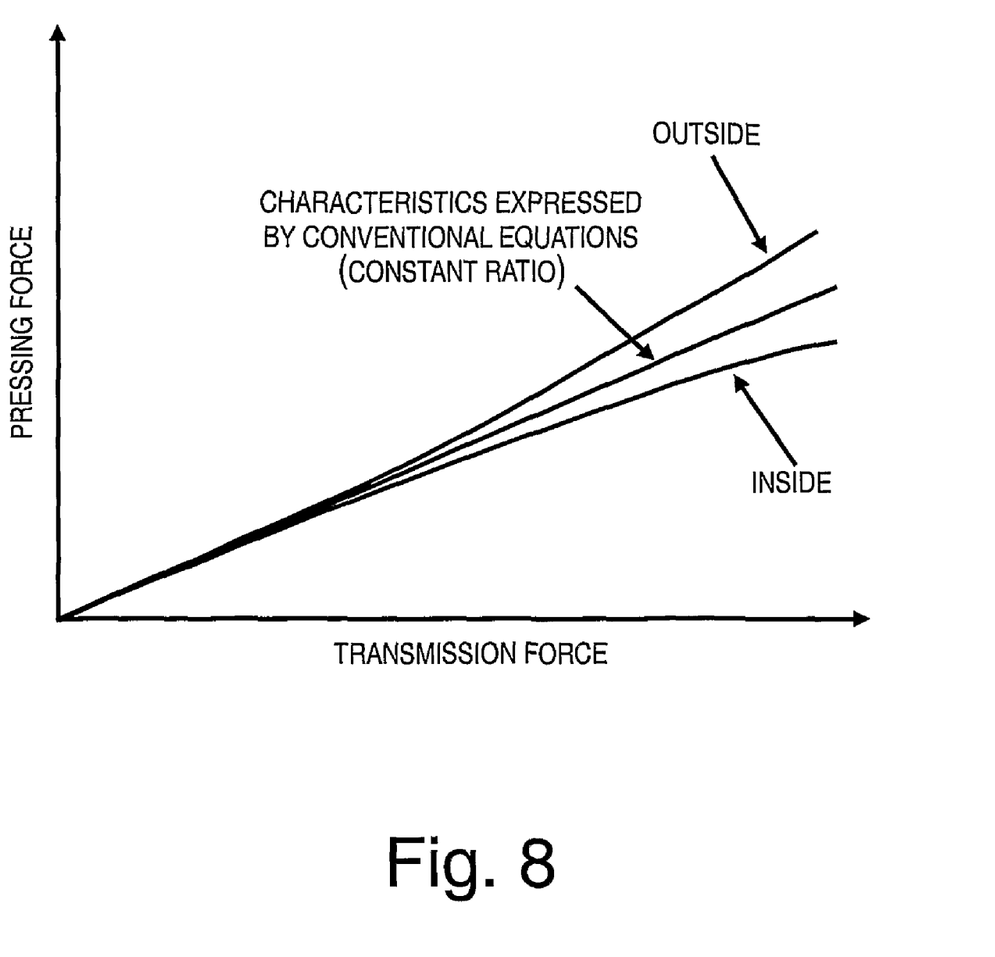
FIG. 8 is a graph illustrating the characteristics of the relationship of the generated pressing force relative to the transmission force in the friction drive device in the friction drive device of the second embodiment.

Referring now to FIGS. 7 and 8, a friction drive device in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

FIG. 7 is a schematic diagram of the friction drive device according to a second embodiment of the present invention in which the center of the cam surface arc is set slightly inside or outside the circumference of radius $r_0$. FIG. 8 is a graph illustrating the characteristics of the relationship of the generated pressing force relative to the transmission force in the friction drive device in the friction drive device of the second embodiment.

Although the characteristics of the pressing force change relative to the transmission force, as shown in FIG. 8, when the center of the cam surface arc slightly inside or outside the circle of radius $r_0$ (i.e., when $R_c - r_c$ is somewhat less or somewhat greater than $r_0$ as shown in FIG. 7), the amplitude of this change is quite small. Therefore, the center of the cam surface arc can also be on or near the circumference of radius $r_0$ with a center at the center axis $O_1$.

One preferred effect obtained by the friction drive device of the present invention is that the ratio of the transmission force and the pressing force is nearly constant regardless of the magnitude of the transmission force. As a result, service life and power transmission efficiency are improved by preventing the generation of excessive pressing force even when the drive force is large via a simple construction that only uses a wedge roller and an actuator.

Furthermore, the processing of the cam surface and the examination of the shape of the completed parts is easy and utility is excellent since the cam profile is simply calculated by the functions of x and y alone with regard to the friction drive device for determining a cam profile by interpolating the discretized values of x, y, and $\theta$ using complex equations such as Equations (1) and (2) used in the some of the embodiments disclosed in U.S. Patent Publication No. 2005/0143211 (See, FIGS. 17-21 and Japanese Patent Application No. 2004-57639).

In these embodiments, the angle formed by a tangent at the contact point of the cam surface 51 and the roller support part (the outer race 4a of the roller bearing 4) is set at less than 6 degrees. The angle formed by the straight line Rc and the y axis of the coordinate system (i.e., the transmission force is at the roller contact point P, and the angle $\alpha$ formed by a tangent line at the contact point of the cam surface 51 and the roller support part (the outer race 4a of the roller bearing 4), is set at less than 6 degrees.

This action provides that although the traction coefficient differs depending on the type of oil and driving conditions, they remain in a certain range. According to Hata et al. ("Idemitsu Tribo Review" No. 12, p. 36 (1986)), this value was 0.1 at maximum. Therefore, if the ratio of the transmission force and the pressing force is less than 0.1, a lack of power transmission due to insufficient pressing force will not occur. In this case, since $\beta \approx \alpha$ when the angle $\alpha$ is set at a value of less than 6 degrees, the ratio of the transmission force and the pressing force becomes tan $\alpha$, and the ratio of the transmission force and the pressing force can be less than 0.1.

In particular, since the drive roller 1 and the driven roller 2 transmit power by oil film shear resistance, the transmission force is at the roller contact point P of the rollers 1 and 2, and the angle $\alpha$ formed by a tangent line at the contact point of the cam surface 41 and the roller support part is set less than 6 degrees, slipping due to insufficient pressing force is forestalled and the resulting reduction in power transmission efficiency is prevented. Thus, in addition to effect mentioned above, an additional effect is obtained in the friction drive device of the present invention of preventing slippage due to insufficient pressing force and the resulting reduction in power transmission efficiency.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired.

Moreover, for example, the simple radius part of the cam surface can be the main part of pressure contact with the rollers alone, and the other part can have another shape such a linear or the like for convenience of processing. The friction drive device of the present invention is not limited to application to transmissions and acceleration/deceleration devices in vehicles inasmuch as the present invention is also applicable to wide-ranging uses in industrial equipment and the like that requires acceleration functions, deceleration functions, and transmission gears. Furthermore, although the first and second embodiments have been described by way of examples of a friction drive device having a speed-up function by a drive roller and a driven roller, the device is also applicable as a friction drive device of a planetary roller-type transmission via a plurality of rollers arranged on an input shaft, or a plurality of driven rollers and a plurality of sets of planet rollers.

Also components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s).

Thus, the foregoing descriptions of the embodiments according to the present invention are provided for illustration only, and not for the purpose of limiting the invention as defined by the appended claims and their equivalents.

What is claimed is:

1. A friction drive device comprising:
a first roller including a roller support part;
a second roller rotatably engaged with the first roller to receives a press force from the first roller at a contact point between the first and second rollers to transmit mechanical power between the first and second rollers; and
a cam member supporting the first roller through the roller support part, the cam member including a cam surface having a slope angle relative to a tangent line at the contact point between the first and second rollers such that the cam surface presses against the roller support part to transmit a drive force between the first and second rollers via friction generated at the contact point;
the first and second rollers having first and second center axes, respectively that are spaced apart by prescribed radial distance, the first and second rollers being further configured and arranged relative to an x y coordinate system when the first and second rollers are not under load such that the x y coordinate system has an x-axis and a y-axis with an origin corresponding to the first center axis of the first roller, and the y-axis passes through the second center axis of the second roller,
the cam surface being located in a first quadrant of the x y coordinate system, and the cam surface having a concaved cross sectional shape lying in a plane perpendicular to the first center axis that forms a concave arc with a single radius, such that the concave arc of the cam surface has a cam surface center located in a third quadrant of the x y coordinate system with the cam surface center of the cam surface lying on or outside of an imaginary arc defined by the prescribed radial distance extending from the first center axis of the first roller.

2. The friction drive device according to claim 1, wherein the first and second rollers are further arranged such that the transmission force at the contact point between the first and second rollers and the angle formed by the tangent line at the contact point of the cam surface with the roller support part is set at less than 6 degrees.

3. A friction drive device comprising:
first roller means for transmitting rotation;
second roller means for transmitting rotation that is engaged with the first roller means to receives a press force from the first roller means at a contact point between the first and second roller means to transmit mechanical power between the first and second roller means; and
cam means for supporting the first roller means for arcuate movement relative to the second roller means, the cam means including a cam surface having a slope angle relative to a tangent line at the contact point between the first and second roller means such that the cam surface presses against the first roller means to transmit a drive force between the first and second roller means via friction generated at the contact point;
the first and second roller means having first and second center axes, respectively that are spaced apart by prescribed radial distance, the first and second roller means being further configured and arranged relative to an x y coordinate system when the first and second roller means are not under load such that the x y coordinate system has an x-axis and a y-axis with an origin corresponding to the first center axis of the first roller, and the y-axis passes through the second center axis of the second roller means, the cam surface being located in a first quadrant of the x y coordinate system, and the cam surface having a concaved cross sectional shape lying in a plane perpendicular to the first center axis that forms a concave arc with a single radius, such that the concave arc of the cam surface has a cam surface center located in a third quadrant of the x y coordinate system with the cam surface center of the cam surface lying on or outside of an imaginary arc defined by the prescribed radial distance extending from the first center axis of the first roller means.

* * * * *